May 10, 1955 F. H. NICOLL 2,707,899
LOW-REFLECTING GLASS
Filed Aug. 28, 1951

INVENTOR
FREDERICK H. NICOLL
BY
ATTORNEY

United States Patent Office 2,707,899
Patented May 10, 1955

2,707,899

LOW-REFLECTING GLASS

Frederick H. Nicoll, Princeton, N. J., assignor to Radio Corporation of America, a corporation of Delaware Application August 28, 1951, Serial No. 244,054

6 Claims. (Cl. 88—1)

This invention relates to an improved article comprising glass having a surface which is low reflecting to light and to methods of making the improved article. More particularly, the invention relates to a glass body having a composite two-layer surface film, the lower layer of which is a skeletonized film of silica and the upper layer of which is a substantially solid layer of silica.

It has previously been known that treating solutions can be prepared to leach out metallic oxide constituents from a surface layer of a glass body leaving a skeletal film of silica and that the depth of this film can be controlled so that it may be a fractional part of a wavelength of light in thickness. Since the refractive index of this type of film can be made much lower than that of the glass itself, the film can be made such that it has very low reflectance for light of some desired wavelength.

Although the skeletal silica type of low reflectance film can be made higher in light transmitting value and lower in reflectance than most other types, it suffers from the disadvantage that it absorbs contamination from the atmosphere at a relatively rapid rate. In order to keep it at its highest efficiency, it must, therefore, be frequently cleaned, if exposed to air. This has proved to be a serious limitation and has resulted in limiting the use of skeletal silica non-reflecting films to optical elements hermetically sealed from the atmosphere.

Another type of film which can be deposited on glass to make it low reflecting is a film of substantially solid silica. Although various processes have been devised to deposit thin, light-transparent films of silica on a glass surface, the type particularly referred to here is that described in U. S. Patent 2,505,629. This patent describes a process of depositing thin films of silica on a glass or other ceramic article surface by immersing the article in a solution of fluosilicic acid which is supersaturated with silica to the extent of about 4–16 millimoles per liter of solution. Films deposited by this process have a refractive index of about 1.46 which is that of solid silica.

Although the solid silica type film deposited as described in the above mentioned patent is quite durable and not easily contaminated by atmospheric exposure, it suffers from the disadvantage that, as a low reflectance film, its refractive index is too high. If used next to glass, unless the glass is of very high refractive index, the lowering in reflectance is not nearly as great as that obtained with several other types of films.

The present invention is in the use of a film which is a composite of the skeletal silica type and the solid silica type mentioned above. It has been found that a two layer film can be formed on silica-containing glass such that the bottom layer is a skeletal film of silica and the top layer is substantially solid silica. For low reflectance applications, there can first be formed a bottom layer of skeletal silica having an optical thickness of ¼λ with respect to light of some desired wavelength in the visible spectrum. On top of this, a layer of solid silica having an optical thickness of ½λ can be laid down. It will be understood that by optical thickness is meant the product obtained by multiplying together the refractive index and the real thickness.

One object of the present invention is to provide an improved type of low reflecting film for glass surfaces.

Another object of the invention is to provide an improved type of low reflecting film having great durability.

Another object of the invention is to provide an improved type of low reflecting film not readily contaminated by exposure to the atmosphere.

Another object of the invention is to provide an improved type of film having relatively good non-reflecting properties and relatively high resistance to atmospheric corrosion.

Still another object of the invention is to provide an improved process of providing a glass body with a low-reflecting surface.

These and other objects will be more apparent and the invention will be more readily understood from the following detail description and the accompanying illustrative drawing of which:

There will now be described one method of making an article which is within the scope of the present invention.

Glass suitable for use in the invention is soda-lime-silica glass of the ordinary window glass type. There may be used, for example, a crown glass having an index of refraction of about 1.52. The index of refraction may vary from about 1.5 to about 1.6, for example, without changing the treating process to any appreciable extent.

A solution capable of providing a low index of refraction surface layer of skeletal silica on glass of the type referred to above may be prepared as described in U. S Patent 2,490,662. The treating solution described in this patent is a solution of fluosilicic acid supersaturated with silica to the extent of about 0–3 millimoles of silica per liter of solution. A supersaturated solution of this type can be made up by diluting ordinary commercial 30% fluosilicic acid to 1.4 molar and adding an excess amount of precipitated silicic acid or hydrated silica. The added silica is allowed to remain in contact with the acid at room temperature (25° C.) for about 24 hours and the solution is then filtered until it becomes clear. The filtrate, which is 1.4 molar acid saturated with silica, is diluted to 1.25 molar. As shown in the above mentioned patent, a 1.4 molar solution of $H_2SiF_6$ saturated with silica is capable of dissolving about 1.2 more millimoles of silica per mole $H_2SiF_6$ than a 1.25 molar solution of the acid. By diluting the saturated 1.4 molar solution to 1.25 molar, there is thus obtained a solution which is supersaturated with silica to the extent of about 1.2 millimoles per mole $H_2SiF_6$ or about 1.5 millimoles per liter of solution.

Figure 1:
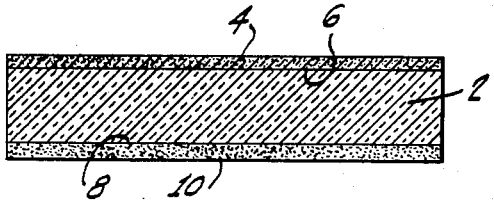
Figure 1 is a cross section view taken through the thickness dimension of a glass body during an intermediate stage of treatment in accordance with the process of the present invention, certain parts being exaggerated in size for purposes of illustration.

A solution made as above described will treat ordinary crown glass at 25° C. to form a low reflecting surface skeletal film of silica. Referring to Figure 1, a glass body 2, to be treated, is simply immersed in the solution and is permitted to remain until a skeletal layer of silica 4 is formed at a surface 6 of the glass. The other surface 8 of the glass may be painted with a layer of resist 10, such as paraffin, unless it is desired to treat both surfaces at the same time. Treatment is continued until the surface film appears to be distinctly purple to reflected light. At this point, it will have minimum reflection for green light of about 5,000 A. and the skeletal surface film will have an optical thickness of about ¼λ.

In order to have maximum reduction in reflection, the film should have an optical thickness of ¼λ. Since the optical thickness is equal to the actual thickness multiplied by the index of refraction, it is necessary that the index of refraction be adjusted to a value which is optimum for the conditions at hand.

Since it is known that the index of refraction of the glass body being used in the example is 1.52 and, since the index of refraction of the ½λ top layer of silica next to be put on will be about 1.46, it can be shown that, to obtain minimum reflection, the index of refraction of the ¼λ skeletal film should be about 1.23 (see Journal Society Motion Picture Engineers, January 1942, page 36, article by G. L. Dimmick, for a discussion of this feature).

The index of refraction of the skeletal film may be controlled by controlling the potency of the treating solution. Generally speaking, the potency of the solution is related to its ability to dissolve silica from the surface of the glass. As the potency of a treating solution is increased, a larger proportion of silica is removed from the surface layer of glass and the index of refracton diminishes due to the relatively higher proportion of voids produced in the film. As explained in the previously referred to Patent 2,490,662, the potency of a treating solution can be increased by adding hydrofluoric acid and may be decreased by adding boric acid. For each glass treated, there is an optimum potency which can be determined by actually treating samples of the glass which are to be made low reflecting.

In carrying out the present example of the invention, then, the potency of the treating solution is adjusted so that a skeletal film is formed having an index of refraction of about 1.23 in order to provide a film having an optical thickness of about ¼λ.

Instead of stopping at a thickness of exactly ¼λ, the skeletal film should be made somewhat thicker than this value for a reason that will be apparent later.

Figure 2:
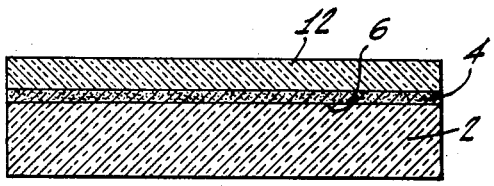
Figure 2 is a view similar to that of Figure 1 showing a completed article made in accordance with the present invention.

With reference to Figure 2, the next step in the process of making articles in accordance with the present invention is to superimpose on the skeletal layer 4 a layer of substantially solid silica 12. This layer will ordinarily have an index of refraction of about 1.46.

The solid silica layer may be deposited by immersing the article in a solution of fluosilicic acid supersaturated with silica to the extent of about 4-16 millimoles per liter of solution. A solution of this type can be prepared as explained in U. S. Patent 2,505,629. The method is also the same as that described in the previously mentioned Patent 2,490,662.

During the initial part of the immersion period, deposited silica begins to fill in the voids near the surface of the layer of skeletal silica and reflection is increased. The reason for making the skeletal layer slightly more than ¼λ in optical thickness is so that there will be an unfilled ¼λ layer remaining after the filling in process. Maximum reflection is obtained when enough silica is deposited to produce a ¼λ layer of deposited silica on top of the ¼λ layer of skeletal silica.

Deposition of the silica is continued through this point of maximum reflection until the next minimum is observed. At this point, a ½λ (optical thickness) layer of silica has been deposited on the ¼λ skeletal layer.

Figure 3:
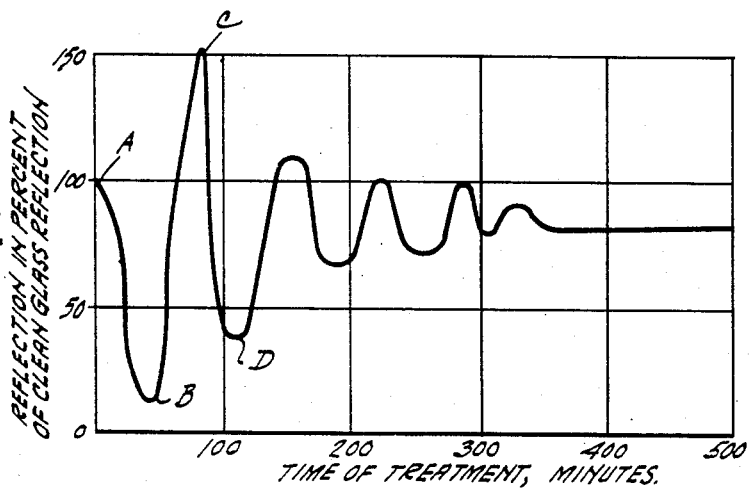
Figure 3 is a graph showing how relative reflection with respect to untreated glass varies with time of treatment, for a glass body treated in accordance with the teachings of the present invention.

Results of measurement of reflection from a surface of a piece of crown glass treated by a method similar in principle to the method above described are shown in Figure 3. The first part of the curve; that is, between points A and B, in this figure, shows that when a piece of glass is immersed in a solution capable of dissolving out constituents from the surface, its reflectivity is decreased to a minimum (point B). At this point, reached after about 40 minutes in the example chosen, a skeletal layer ¼λ in optical thickness has been formed. The glass is then immersed in a silica depositing solution and, as silica is deposited, reflectivity rises to a maximum as shown by that portion of the curve between B and C. At the point C, reached after about 80 minutes, a reflectivity over 150% of that of the original clean glass surface is obtained. It is at this point that a solid silica layer of ¼λ is assumed to have been deposited. With continued deposition, reflectivity again falls, as shown by the portion of the curve between C and D. At point D, reached after about 110 minutes, reflectivity is again a minimum and although not as low as that of the skeletal film, alone, it is about 40% that of the untreated clean glass surface. At the point D, it may be assumed that a ½λ layer of solid silica has been deposited.

If deposition is continued past the second reflectivity minimum, reflection alternately rises and falls as the silica layer goes through odd and even multiples of the ¼λ film. Each maximum and each minimum is, however, less pronounced than the one preceding.

There are other methods besides the preferred process described above which may be used for preparing the improved articles of the present invention. In U. S. Patent 2,486,431, for example, there is described a process of treating glass surfaces to provide them with low reflecting skeletal surface films of silica.

As described in the patent last referred to, a piece of soda-lime-silica glass may be immersed in a solution of fluosilicic acid until interference films begin to form at the surfaces being attacked by the acid. Appearances of the interference films are an indication that the acid solution has dissolved the proper amount of the constituents of the glass to become a good treating solution. A fresh piece of glass is then immersed in the solution. At first, as described in the patent, a low reflecting skeletal film of silica is formed on the surface. This was the objective described and claimed in the patent. However, it has now been found that, if the glass is permitted to remain in the treating solution after the surface has been modified such that it has a minimum of reflectivity, the reflectivity will begin to rise until it reaches a maximum, as shown at point C of the curve of Figure 3, and then will start to fall until it has reached another minimum, as shown at point D of the curve.

What has happened is essentially the same thing as described in the embodiment of the process first referred to. After a substantially ¼λ thick skeletal film has formed, instead of the voids in the film being further deepened, silica begins to deposit, filling in the top surface of the skeletal layer and then building up a film of substantially solid silica.

In this form of the process, care must be taken to maintain the proper relationship between the volume of the treating solution and the surface area of the glass immersed in the solution. If, for example, a relatively large volume of solution has been brought to the point where it is ready to treat a fresh piece of glass to skeletonize its surface, treatment may not proceed properly if the glass to be treated has a very small surface area. The leaching process may continue indefinitely and no deposition may take place. On the other hand, if too large a piece of glass is immersed for treating, leaching may stop too soon before a ¼λ film has been formed. Although by no means limited to this exact ratio, a preferred ratio between volume of treating solution, in cc., and area of surface to be treated, in square cm., is 1 to 1. This may be varied considerably but the extent of variation will be found to vary so widely for different kinds of glass that no definite limits can be set.

The skeletal film of silica does not have to be etched into the surface of the glass. It may be deposited on top by any of the methods which have been used in the past.

The articles made as described have good low reflectance properties although reflection of incident white light will be generally higher than for single layer films. The principal advantage of the improved articles is that the surface is hard and durable and does not readily absorb contaminating substances like skeletal films do.

The types of glasses which can be successfully treated are of the soda-lime-silica type. Crown glass is preferred but flint glass may also be treated.

After the glass has been treated, the layer of resist 10 is normally removed as indicated in Figure 2. Where both sides of the glass have been treated, as is more often the case, no resist will have been applied to begin with.

I claim as my invention:

1. An article comprising a glass body having a refractive index of about 1.52, the major constituents thereof being soda-lime and silica, and having a surface layer of skeletonized silica having an optical thickness of ¼λ with respect to a particular wavelength of light and a layer of essentially solid silica superimposed on said surface layer, said last mentioned layer having an optical thickness of ½λ with respect to said particular wavelength, said skeletonized layer having an index of refraction of about 1.23 and said solid layer having an index of refraction of about 1.46.

2. An article comprising a sheet of glass having a refractive index of about 1.52 and including soda-lime and silica as major constituents thereof, at least one surface of which is provided with a two-layer film of which the lower layer consists essentially of a film of skeletonized silica having an optical thickness of ¼λ with respect to a particular wavelength of light, and of which the top layer consists essentially of a film of solid silica having an optical thickness of ½λ with respect to said particular wavelength, said skeletonized layer having an index of refraction of about 1.23 and said solid layer having an index of refraction of about 1.46.

3. A method of producing an optical element having a surface which is relatively low reflecting to light of a particular wavelength, comprising dissolving a network of material from a surface of a glass body such that a layer of skeletonized silica about ¼λ in optical thickness with respect to said particular wavelength remains on said surface and then depositing on said skeletonized layer a layer of essentially solid silica having an optical thickness of ½λ with respect to said particular wavelength, said depositing being accomplished in an aqueous solution.

4. A method of producing an optical element having a surface which is low reflecting to light of a particular wavelength, comprising immersing a glass body in a solution of fluosilicic acid capable of dissolving a network of material from a surface of said body thereby to dissolve a network of material from said surface until there has been formed on said surface a layer of skeletonized silica which is about ¼λ in optical thickness with respect to a particular wavelength of light, and then immersing said body in a solution comprising fluosilicic acid capable of depositing a film of silica upon said surface thereby to deposit solid silica upon said skeletonized layer until there is superimposed on said skeletonized layer a layer of essentially solid silica having an optical thickness of ½λ with respect to said particular wavelength.

5. A method of producing an optical element having a surface which is low reflecting to light of a particular wavelength, comprising immersing a glass body in a first solution of fluosilicic acid supersaturated with silica to the extent of from 0–3 millimoles per liter, allowing said first solution to act upon said body until the reflection of said particular wavelength of light from a surface of said body has been reduced to a minimum, and then immersing said body in a second solution of fluosilicic acid supersaturated with silica to the extent of 4–16 millimoles per liter of solution and allowing said second solution to act upon said body until the reflection of light of said wavelength from said surface has gone through a maximum and has reached another minimum.

6. A method of producing a silica-glass optical element having a surface which is low reflecting to light of a particular wavelength, comprising immersing in a solution including fluosilicic acid a piece of a silica-containing glass, continuing said immersion until there is formed at a surface of said glass within said solution a film which is low reflecting to light of said wavelength, removing the glass thus treated, immersing said optical element in said solution, continuing said last mentioned immersion until said optical element has acquired a film which is low reflecting to light of said wavelength, and continuing said last mentioned immersion until the reflection to light of said wavelength has gone through a maximum greater than the original reflection and has reached a second minimum.

References Cited in the file of this patent

UNITED STATES PATENTS

| | | |
|---|---|---|
| 2,220,861 | Blodgett | Nov. 5, 1940 |
| 2,466,119 | Moulton et al. | Apr. 5, 1949 |
| 2,474,061 | Moulton | June 21, 1949 |
| 2,486,431 | Nicoll et al. | Nov. 1, 1949 |
| 2,490,662 | Thomsen | Dec. 6, 1949 |
| 2,505,629 | Thomsen et al. | Apr. 25, 1950 |
| 2,531,945 | Moulton | Nov. 28, 1950 |